Patented Nov. 1, 1932

1,885,390

UNITED STATES PATENT OFFICE

OSCAR TEXTOR, OF SHAKER HEIGHTS, AND BERT O. CRITES, OF CLEVELAND, OHIO

CLEANING COMPOSITION

No Drawing. Application filed December 15, 1928. Serial No. 326,404.

This invention relates to cleaning compounds; and it is among the objects of the invention to provide a composition of high efficiency and yet which is not unduly costly. Other objects and advantages will appear as the description proceeds.

To the accomplishment of the foregoing and related ends, the invention, then, consists of the features hereinafter fully described, and particularly pointed out in the claims, the following description setting forth in detail but one of the various ways in which the principle of the invention may be employed.

In accordance with our invention, we employ sodium hydrogen sulphate ($NaHSO_4$) and a salt capable of furnishing sulphate ion, preferably sodium sulphate ($Na_2SO_4$). Most advantageously the materials may be made up in the form of a pulverulent or granular mass, a grain size of 20–50 mesh being particularly desirable in most cases.

It is not necessary that the ingredients be chemically pure, the commercial form of sodium hydrogen sulphate known as niter cake being quite satisfactory, and similarly the commercial form of sodium sulphate known as salt cake is suitable.

The proportions of the ingredients may vary in quite a wide range, depending upon particular conditions contemplated, but in general we prefer a proportion of about 25 per cent. of sodium hydrogen sulphate and about 75 per cent. of sodium sulphate.

A composition along such lines may be employed in a varied range of detergent usages, and is notably efficient for cleaning and removing stains from stone and stone-like surfaces, marble, porcelain, etc., and is thus seen to afford a desirable combination in a form facilitating handling and packaging, and having the further advantage of being wholly soluble in water and quickly effective in situations where it is desired to use it by adding to water as distinguished from using it by moistening and employing it as a rubbing compound.

Other modes of applying the principle of the invention may be employed, change being made as regards the details disclosed, provided the ingredients stated in any of the following claims, or the equivalent of such, be employed.

We therefore particularly point out and distinctly claim as our invention:—

1. A cleaning composition, which comprises finely divided sodium hydrogen sulphate about 25 per cent, and sodium sulphate about 75 per cent.

2. A cleaning composition, which consists of a substantially completely soluble mixture of pulverulent particles of nitre-cake and salt-cake, the salt cake being in predominant proportion.

Signed by us this 14th day of December, 1928.

OSCAR TEXTOR.
BERT O. CRITES.